United States Patent

[11] 3,571,593

[72] Inventor Kiichi Komatsubara
 Kodaira-shi, Japan
[21] Appl. No. 800,068
[22] Filed Feb. 18, 1969
[45] Patented Mar. 23, 1971
[73] Assignee Hitachi, Ltd.
 Tokyo, Japan
[32] Priority Feb. 19, 1968, Sept. 6, 1968
[33] Japan
[31] 43/10070 and 43/63732

[54] INFRARED AND FAR INFRARED DETECTOR OR AMPLIFIER USING MOS STRUCTURE ELEMENT
10 Claims, 16 Drawing Figs.
[52] U.S. Cl. .................................................. 250/83.3
[51] Int. Cl. .................................................. G01j 5/20
[50] Field of Search .......................................... 250/83.3,
(IR), (IRI)

[56] References Cited
UNITED STATES PATENTS
| | | | |
|---|---|---|---|
| 3,070,698 | 12/1962 | Bloembergen | 250/83.3IR |
| 3,274,387 | 9/1966 | Putley | 250/83.3IR |
| 3,483,320 | 12/1969 | Gebel | 250/83.3IRI |

Primary Examiner—Archie R. Borchelt
Attorney—Craig, Antonelli, Stewart & Hill

ABSTRACT: A device using a MOS structure element, in which the element is cooled to such a low temperature that substantially all of the carriers in the inversion layer populate in the ground level of the quantized energy levels formed in that layer in order that the energization of the electric field or the radiation causes the resonance transition, and in which an infrared or far infrared radiation beam directed to that layer is spectrally detected or amplified by the variation in the channel current or the stimulated emission both of which are caused by the change in the carrier population due to the resonance transition.

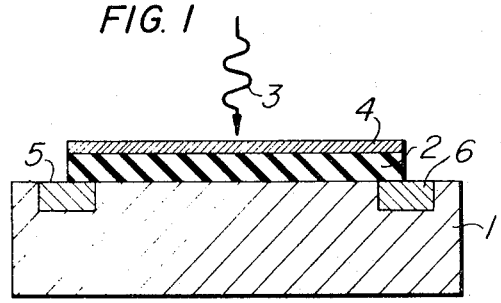
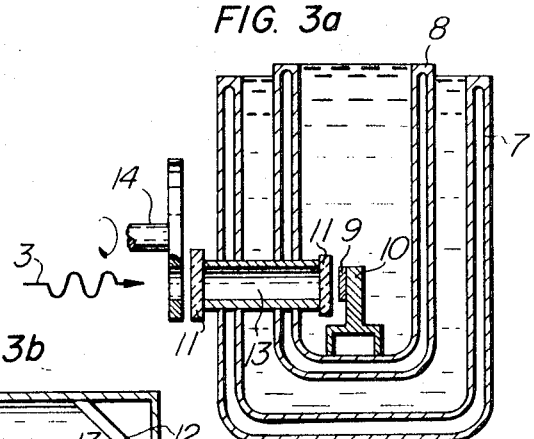
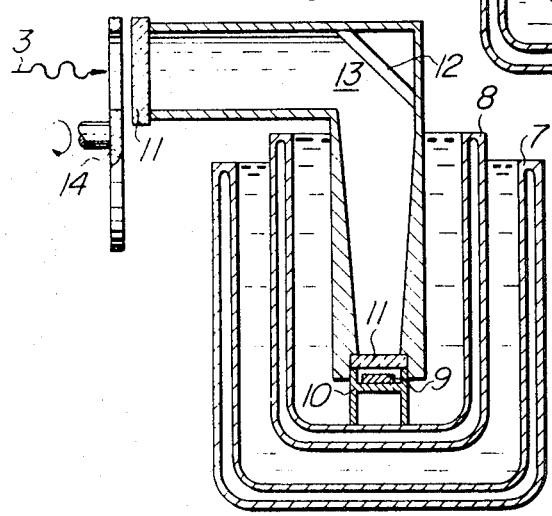

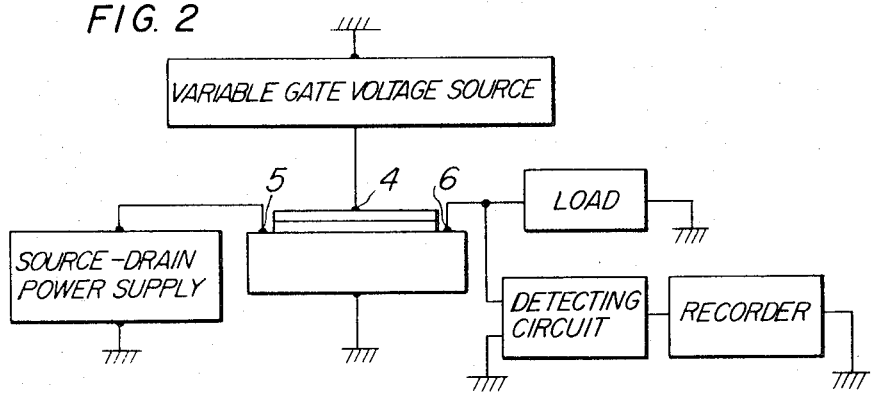
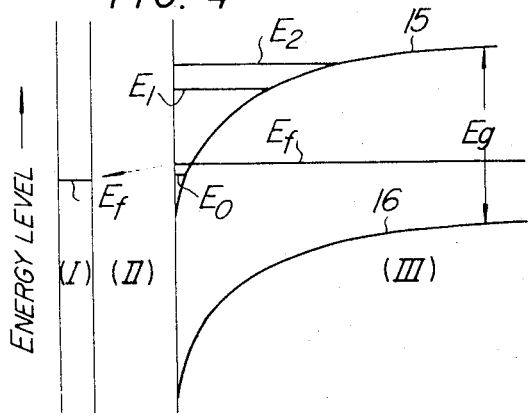
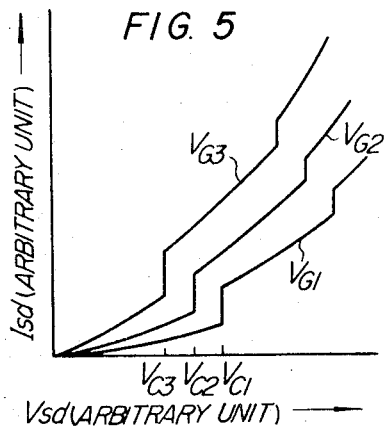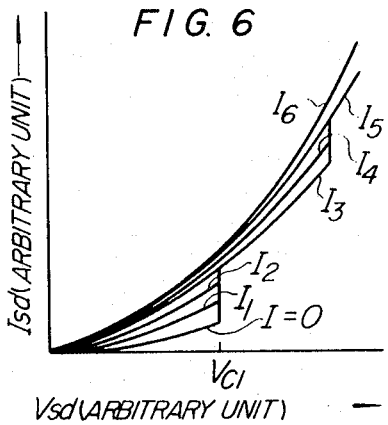

INVENTOR
Kiichi Komatsubara

BY Craig, Antonelli, Stewart & Hill

ATTORNEYS

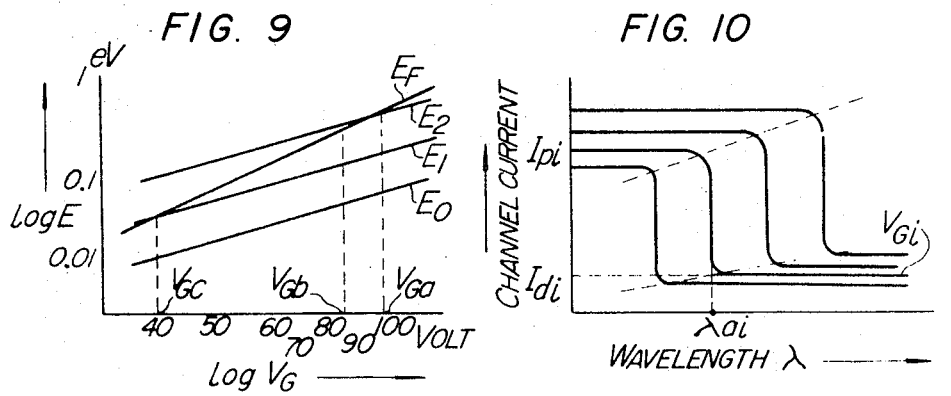
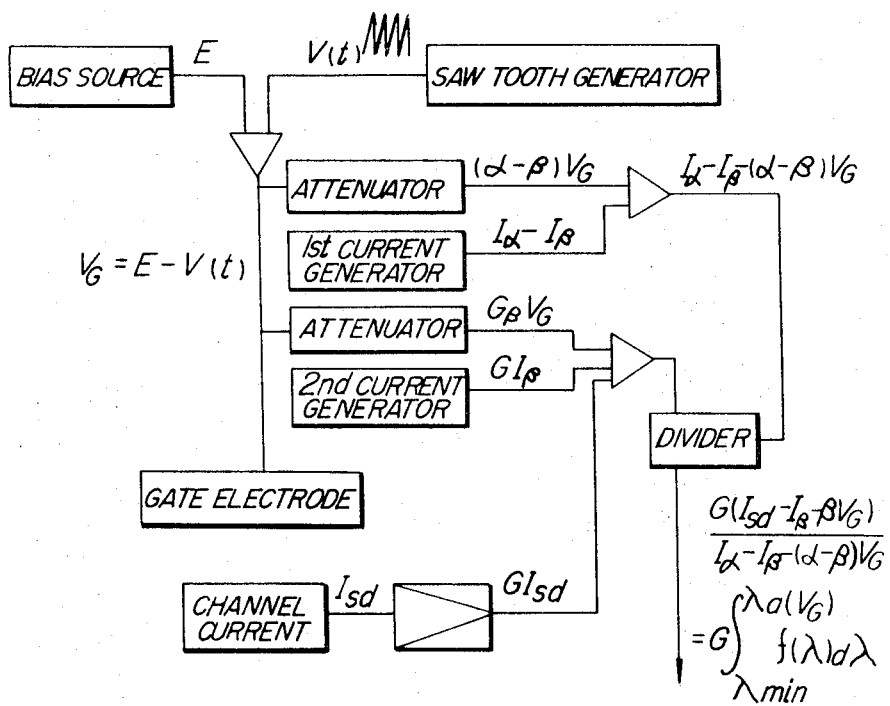

INVENTOR
Kiichi Komatsubara

BY Craig, Antonelli, Stewart & Hill

ATTORNEY

INFRARED AND FAR INFRARED DETECTOR OR AMPLIFIER USING MOS STRUCTURE ELEMENT

This invention relates to detection or amplification of infrared and far infrared rays and more particularly to a spectral device using MOS structure element.

Up to now, many semiconductor detectors are known in which radiation energy in the range of from infrared to far infrared is converted into an electrical signal. These detectors usually respond to wavelengths in a wide range and hence cannot detect only a desired wavelength component. Therefore, dispersion means such as a prism, a diffraction grating or a combination of filters is needed for spectral detection, but then the device for the purpose becomes large and complicated.

In addition to this, a few semiconductor devices are known in which said radiation energy can be detected spectrally.

One of these is a device in which infrared rays are directed to an InSb crystal body to which a variable hydrostatic pressure is applied and the absorption edge of the crystal is changed in a range from $1\mu$ to $6\mu$ by the applied pressure, thus spectral detection is performed.

Another of these devices is a semiconductor using a magnetic effect, in which the energy of infrared rays is resonantly absorbed by the cyclotron motion of carriers in a semiconductor crystal body to which a magnetic field is applied and the wavelength component to be absorbed varies with the intensity of the magnetic field.

As can be seen from the above description, a conventional device in which infrared rays are spectrally detected requires various dispersion means, and hence is not only large and complicated but also the scanning range of the wavelength component is narrow and the scanning rate is low.

A principal object of the present invention is to provide a semiconductor device which has a simple structure and can perform spectral detection of infrared and far infrared rays.

Another object of the present invention is to provide a detector capable of detecting continuously and spectrally infrared and far infrared rays in a wavelength range from several $\mu$ to several tens of $\mu$.

Another object of the present invention is to provide a scanning type detector which makes a spectral detection in said wavelength range repeatedly at a high speed in the order of 100 kHz.

A further object of the present invention is to provide a novel means which amplifies radiation energy in a range from infrared to far infrared radiation via he stimulated emission of radiation.

Still another object of the present invention is to provide a device which can perform the above-mentioned functions and yet is rugged and inexpensive.

According to the the present invention there is provided a solid-state electronic device for detecting or amplifying a radiation beam in the range from infrared to far infrared comprising a MOS element having the property of producing an inversion layer therein in response to a gate voltage applied thereto; means for cooling said element to such a low temperature that substantially all of the carriers in said inversion layer populate in the ground quantum level formed therein, said cooling means being equipped with optical path means to direct a radiation beam to said inversion layer; a voltage source for applying a variable gate voltage to said element to control the energy difference between said ground level and an excited level formed in said inversion layer; and an electric circuit for setting and measuring the intensity of a channel current flowing and measuring the intensity of a channel current flowing through said layer, whereby the electronic transition between said levels occurs correspondingly to said current and said radiation to provide detection or amplification of said radiation.

The present invention briefly described here above is based on the principle described hereunder: As is well known, when a high voltage is applied between a metal layer and a semiconductor layer of a MOS structure element, many carriers are accumulated on the semiconductor surface contacting an insulator layer and a sharp potential valley is formed on the surface, and a thin inversion layer is also formed there which has a conductivity type opposite to the original conductivity type of the semiconductor body. For example, the inversion layer is 500A—600A in depth when electrons of $5\times10^{11}$ electrons/cm$^2$ in surface density are accumulated on the surface of a P-type InSb body at 4.2° K. At this time, the de Broglie wavelength of the electron is 500A—600A, where $h$ is Planck's constant, $m^*$ is the effective mass of the electron, $k$ is Boltzmann's constant, and $T$ is the temperature of the element in ° K. The electron motion in a direction perpendicular to the surface is quantized and discrete quantum levels are formed in the inversion layer since the width of the potential valley and the de Broglie wavelength are comparable. These quantized energy levels $E_1$ are expressed as a function of the surface charge density $n_s$ as follows:

$$E_0 = \frac{1.22}{m^{*\frac{1}{3}}} \times \left(\frac{3\pi^2 h^2 n_s}{\epsilon}\right)^{\frac{2}{3}} \times \left(l+\frac{3}{4}\right)^{\frac{2}{3}},$$

Where $m^*$ is the effective mass of the electron, is Planck's constant $h$ divided by $2\pi$, $\epsilon$ is the dielectric constant of the semiconductor, and is a quantum number such as 0, 1, 2, ......

Of course, $E_1$ depends upon such physical quantities as the energy gap of the forbidden band in the semiconductor, impurity concentration and gate voltage, though $E_1$ is expressed as a function $n_s$ in the above equation.

When $\Delta E$, that is, the difference ($E_1-E_0$) of the first excited level $E_1$ from the ground level $E_0$, is much larger than the mean energy $kT$ ($k$ is Boltzmann's constant and $T$ is the temperature of the element in ° K.) of electrons, the first excited level is completely separated from the ground level. Here, the value $\Delta E$ also depends upon the gate voltage as $E_0$ and $E_1$ do.

When the MOS element is cooled to such a low temperature that most electrons populate in the ground level due to a decrease in the mean energy of electrons and when a radiation beam is directed to the inversion layer, a portion of the electrons in the ground level is excited to the first excited level by absorbing the radiation beam. Such electronic transition between the levels changes the channel current flowing through the inversion layer. Consequently, the intensity of the radiation beam can be detected in the form of variation in the channel current.

Also, when the electrons in the ground level are sufficiently energized by an intense source-drain voltage, a large quantity of electrons is excited to the first excited level and population inversion arises. When a radiation beam with a wavelength equivalent to $\Delta E$ is directed to the inversion layer of the MOS element in such a state, the incident radiation beam is amplified by the stimulated emission.

Objects, principle, advantages and features of the present invention will become more apparent from the following description of some preferred embodiments of the present invention in conjunction with the accompanying drawings, in which:

FIGS. 1 and 2 are a cross section of a MOS structure element and a block diagram of a circuit connected to the element, respectively, which are used in an embodiment of the present invention for detecting a radiation beam;

FIGS. 3a and 3b are cross sections of embodiments of the present invention in which electrical connections are not shown;

FIG. 4 is an energy diagram of the element of FIG. 1 which is employed in the embodiments of FIGS. 3a and 3b;

FIG. 5 is a graph showing the current-voltage characteristic of the channel current flowing through the inversion layer in the element employed in the embodiments of FIGS. 3a and 3b;

FIG. 6 is a graph showing the current-voltage characteristic of FIG. 5 with a radiation beam is directed to the inversion layer;

FIG. 9 is a graph showing the relation between the gate voltage and energy level of an element used in an embodiment of the scanning spectrometer according to the present invention;

FIG. 10 is a graph showing the dependence of the absorption edge on the gate voltage of said element;

FIG. 11 is a block diagram showing a computing circuit for the channel current used in said embodiments;

Figure 7A:
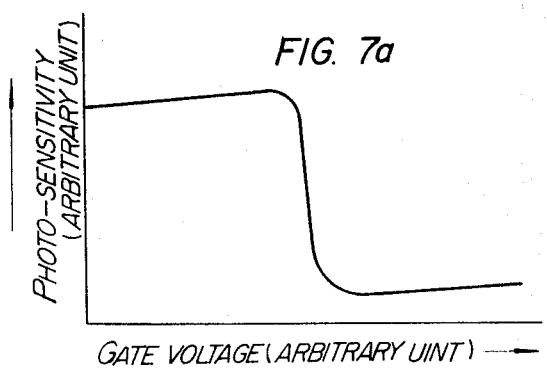
FIGS. 7a and 7b are graphs showing the photosensitivity and differential photosensitivity of said element to the gate voltage, respectively.

First the construction, principle of operation, features and characteristics of an embodiment for detecting a radiation beam according to the present invention will be described.

Referring to FIG. 1, there is shown a cross section of a MOS element used in an embodiment of the present invention. One surface of a P-type semiconductor crystal body 1 is coated with an insulator layer 2 (for example, SiO or $SiO_2$), which in turn is coated with a thin metal layer 4. The metal layer 4 is used as a gate electrode and as the surface for receiving a radiation beam 3. The layer 4 is made thin so that the incident beam can pass therethrough and is made of a material such as Au, Ag or Al depending upon the desired wavelength range to be transmitted.

The $n^+$ Layers 5 and 6 are provided on said surface of the crystal body 1 by the diffusion method, which layers are used as a source electrode and drain electrode, respectively. In this case, the source and drain electrodes may be made of evaporated metal which are in ohmic contact with the crystal body 1 instead of the diffused layers 5 and 6. Further, in case a semiconductor crystal is used which substantially does not absorb a radiation beam in the desired wavelength range, the radiation beam can be made to reach the inversion layer by directing it to the surface of the semiconductor body opposite to the surface contacting with the insulator layer.

Referring to FIG. 2, there is shown a block diagram of a circuit connected to said element. A variable gate voltage source is connected to the gate electrode 4 and a variable gate voltage is applied to the element. The source electrode 5 and drain electrode 6 are connected to a variable source-drain power supply through a load, and a desired source drain voltage is applied thereto. A channel current flowing through said circuit is detected and recorded by a detecting circuit and a recorder in the form of a load voltage.

Referring to FIGS. 3a and 3b, there are shown sectional views of embodiments of the invention from which the electrical connection is eliminated. An element as shown in FIG. 1 is placed in a cryostat provided with optical path means for guiding a radiation beam to the element. In the FIGS. Dewar vessel 8 holding liquid helium therein is shielded from ambient temperature by liquid nitrogen contained in Dewar vessel 7. The element 9 is mounted on a support 10 and submerged in the liquid helium. The optical path means 13 including window members 11 made of material such as KRS-5 and a reflecting mirror 12 directs the radiation beam 3 to he element 9. The window members 11 transmit the desired wavelength component and intercept unnecessary short wavelength components. The reflecting mirror 12 deflects the optical path. The radiation beam 3 is periodically interrupted by a rotary optical chopper 14 disposed at the entrance of the optical path means. Here, lead wires connected to the element 9 as well as the electrical circuit are not shown.

When a positive voltage is applied to the gate electrode of said element, many electrons are collected on the semiconductor surface contacting the insulator layer and a so-called inversion layer is produced there.

FIG. 4 shows energy levels of electrons at and in the vicinity of said surface. Regions designated by (I) (II) and (III) are a metal layer, insulator layer and semiconductor layer, respectively. There is produced a sharp potential valley at the surface of the semiconductor as described before and as shown in the FIG. The reference numeral 15 indicates the bottom level of the conduction band and 16 indicates the top level of the filled band. Further, $E_f$ indicates the Fermi energy level and $E_g$ is the energy gap of the forbidden band. Moreover, clear quantized levels $E_0$, $E_1$, $E_2$, ... (ground, first excited, second excited level, ...) are produced at the surface of the semiconductor since the element is cooled to a low temperature such as the temperature of liquid helium.

When the radiation beam reaches the inversion layer in this embodiment, the radiation energy can excite electrons in the ground level to he excited levels. Such electronic transition between the quantum levels clearly makes the channel current change at a suitable source-drain voltage since electrons in different energy levels have different mobilities. It has been experimentally confirmed that such electronic transition between the quantum levels can be caused not only by the absorption of radiation energy but also by energization of electrons by means of the source-drain voltage.

Referring to FIG. 5, there is shown a graph of experimentally obtained results of the relation between the source-drain voltage $V_{sd}$ and channel current $I_{sd}$ under the condition that no radiation energy is present. Three curves show the results obtained at three different gate voltages $V_{G1}$, $V_{G2}$ and $V_{G3}$ ($V_{G1} < V_{G2} < V_{G3}$). These curves show that the channel currents jump discontinuously at source-drain voltages $V_{C1}$, $V_{C2}$ and $V_{C3}$, respectively. This means that electronic transition between the quantum levels occurred at these voltages by the voltage energization.

Figure 7B:
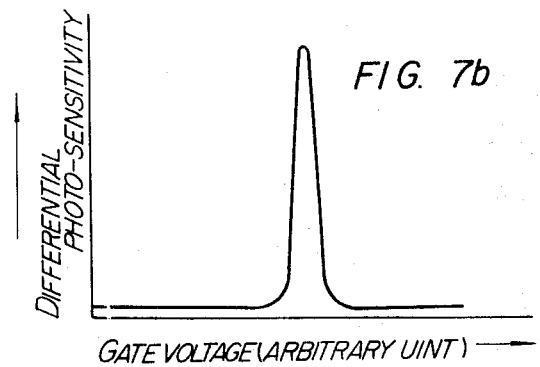

Referring to FIG. 6, there are shown results of experiments where a radiation beam is directed to the element to which the gate voltage $V_{G1}$ is applied. The curve indicated by $I = 0$ shows the result obtained when the radiation beam is interrupted and the curves indicated by $I_1$, $I_2$, $I_3$, $I_4$, $I_5$ and $I_6$ are results obtained when the radiation beam is directed to the element (radiation intensity $I_1 < I_2 < ... < I_6$). As is evident from FIG. 6, the effect of the radiation beam on the channel current becomes smaller after the electronic transition has occurred. Then, when $V_{sd}$ is set at $V_{C1}$ and the gate voltage is scanned around $V_{G1}$, the channel current changes abruptly at the gate voltage $V_{G1}$. That is, the photosensitivity of the element shows an abrupt change at the value $V_{G1}$ of the gate voltage as shown in FIG. 7a. Therefore, the differential value of the photosensitivity to the gate voltage gives a sharp pulse as shown in FIG. 7b.

Figure 8:
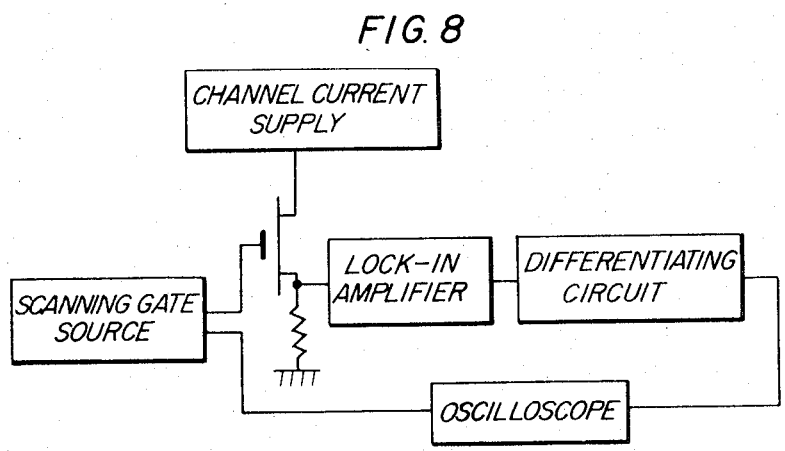
FIG. 8 is a block diagram of a circuit for obtaining the said differential photosensitivity versus gate voltage characteristic.

Referring to FIG. 8, there is shown a block diagram of a circuit embodying said operation. The radiation beam is directed into the element after being periodically interrupted by said optical chopper. The channel current is amplified by a lock-in amplifier coupled with the optical chopper with low noise. The amplified output corresponding to the gate voltage was differentiated and then detected by an oscilloscope. Though, the detection utilizes a surface charge phenomenon, the radiation can be detected with a high S/N ratio by means of the construction described above according to the present invention.

Second, a scanning spectrometer of the present invention which spectrally detects the radiation energy will be described in detail.

It has been described hereinbefore that the electronic transition between the quantum levels occurred by the radiation energy directed to the inversion layer of the MOS element kept at low temperature. In this case the wavelength component effective to the electronic transition is the component having a wavelength shorter than the wavelength equivalent to the energy difference $\Delta E = E_1 - E_0$. The longer wavelength component passes through the inversion layer without causing electronic transition and exerts no influence on the channel current. That is, the element has an absorption edge equivalent to the energy $\Delta E = E_1 - E_0$. As has been described before, the quantum levels $E_0, E_1, E_2, \ldots$ *are a function of the gate voltage, and hence* $\Delta E = E_1 - E_0$, that is, the absorption edge also changes with the gate voltage.

Referring to FIG. 9, the dependence of the quantum levels on the gate voltage is shown with respect to a MOS element using a P-type InSb. Energy levels $E_0$, $E_1$ and $E_2$ are ground level, first excited level and second excited level, respectively, and $E_F$ is the Fermi level. When $E_F$ is in the range between $E_0$ and $E_2$, the probability of resonance transition is high and said transition is utilized effectively in this range. In the FIG., $\Delta E = E_1 - E_0$ at $V_{Ga}, V_{Gb}$ and $V_{Gc}$ corresponds to the photon energy of wavelength $15\mu$, $20\mu$ and $60\mu$, respectively. Therefore, when the gate voltage changes from 40v. to 100v., the absorption edge changes from $60\mu$ to $15\mu$.

The above described dependence of the quantum levels upon the gate voltage was obtained for a certain element and this dependency varies with the surface state of the semiconductor, the thickness of the insulator layer and the like. In the case of a MOS element using InSb, an absorption edge of about $5\mu$ to $60\mu$ can be utilized.

Usable ranges of absorption edge of various MOS elements using other semiconductors are as shown in the following table.

TABLE

| Usable range of absorption edge, $\mu$ | Semiconductor material | Energy gap of forbidden band at 4.2° K., ev. | Specific dielectric constant |
|---|---|---|---|
| 5~60 | InSb | 0.236 | 16 |
| 10~30 | InAs | 0.43 | 12.6 |
| 13~26 | GaSb | 0.813 | 11.24 |
| 15~30 | GaAs | 1.52 | 12.96 |

This embodiment is for spectrally detecting a radiation beam by utilizing the change in the absorption edge due to the variation in the gate voltage and the construction thereof will be successively described. The variation in the gate voltage changes not only the absorption edge but also the photosensitivity of the element.

Referring to FIG. 10, there is shown a diagrammatic drawing for illustrating the above described phenomena, that is, the drawing shows the change in the channel current with the wavelength of the radiation when the gate voltage is fixed at various values and when radiation energy of various wavelengths is directed to an element to which is applied such a low source-drain voltage $V_{sd}$ that the electronic transition is not caused by the field energization As can be seen from the drawing, not only the absorption edge $\lambda_{ai}$ but also the photo current $I_{pi}$ and dark current $I_{di}$ change with the gate voltage. Then, the spectral detection of the radiation beam should be carried out so as to compensate for said change in photosensitivity.

When a radiation beam having an intensity distribution $f(\lambda)$ is directed to an element to which a gate voltage $V_{Gi}$ is applied, a channel current $$I_{sd} = (I_{pi} - I_{di}) \int_{\lambda_{min}}^{\lambda_{ai}} f(\lambda) d\lambda + I_{di}$$

is produced, where $\lambda_{min}$ is the shortest wavelength of the radiation beam directed to the element.

Assuming that $I_p(V_G)$ and $I_d(V_G)$ are approximately equal to $I\alpha - \alpha V_G$ and $I\beta - \beta V\beta$, respectively, the above equation can be expressed as $$\frac{I_{sd} - (I_\beta - \beta V_G)}{(I_\alpha - I_\beta) - (\alpha - \beta) V_G} = \int_{\lambda_{min}}^{\lambda_a(V_G)} f(\lambda) d\lambda.$$

The left-hand side of this equation is the channel current converted by the gate voltage $V_G$ and element constants such as $I\alpha, I\beta, \alpha$ and $\beta$. On the other hand, the right-hand side shows the radiation intensity integrated from the shortest wavelength $\lambda_{min}$ to the absorption edge $\lambda_a(V_G)$.

Therefore, as the gate voltage is swept towards lower values while the conversion is being effected, there are successively produced converted channel currents corresponding to integrations of the radiation beam from a short wavelength to a longer wavelength.

Referring to FIG. 11, there is shown a block diagram of a computing circuit for carrying out said conversion. The periodically changing gate voltage $V_G$ is generated by a bias source and a sawtooth generator and applied to the gate electrode. The gate voltage is also applied to an attenuator and converted into the current $(\alpha - \beta) V_G$. The current $(\alpha - \beta) V_G$ is coupled with a current $(I\alpha - I\beta)$ from a first current generator and the resulting current $(I\alpha - I\beta) - (\alpha - \beta) V_G$ is applied to a divider. Furthermore, a current $G\beta V_G$ from another attenuator, a current $GI\beta$ from a second current generator and an amplified channel current $GI_{sd}$ are coupled together and the resulting current $G(I_{sd} - I\beta - \beta V_G)$ is also applied to the divider. Here, $G$ is a desired amplification factor. Therefore, the output from the divider becomes $$\frac{G(I_{sd} - I_\beta - \beta V_G)}{(I_\alpha - I_\beta) - (\alpha - \beta) V_G},$$

and this is equal to $\int_{\lambda_{min}}^{\lambda_a(V_G)} f(\lambda) d\lambda$ amplified by the factor $G$, Since the gate voltage changes periodically in said circuit, the output of the divider periodically indicates values of radiation intensity integrated successively to longer wavelength. Then, when the output expressed by the above equation is differentiated in synchronization with the gate voltage, an electrical output corresponding to the intensity distribution $f(\lambda)$ is obtained periodically. Therefore, in such circuit construction, a direct-reading spectrometer can be provided by scanning the gate voltage relatively slowly and by coupling said electrical output to a display means (for example a recorder). Besides, the logarithm of each of the quantum level $E_0$ and $E_1$ is linear to the logarithm of the gate voltage as shown in FIG. 9. Then, the energy value $(E_1 - E_2)$ corresponding to the absorption edge is not in linear relation with the gate voltage. Therefore, when the gate voltage is converted by a circuit having a nonlinear element in such a way that the absorption edge $\lambda_a$ or its reciprocal changes linearly with time and the converted output is applied to the scanning terminal of an oscilloscope (the output described above being applied to its signal terminal), the distribution of the radiation intensity relative to the wavelength or wave number is displayed on the face of the cathode-ray tube.

Figure 12:
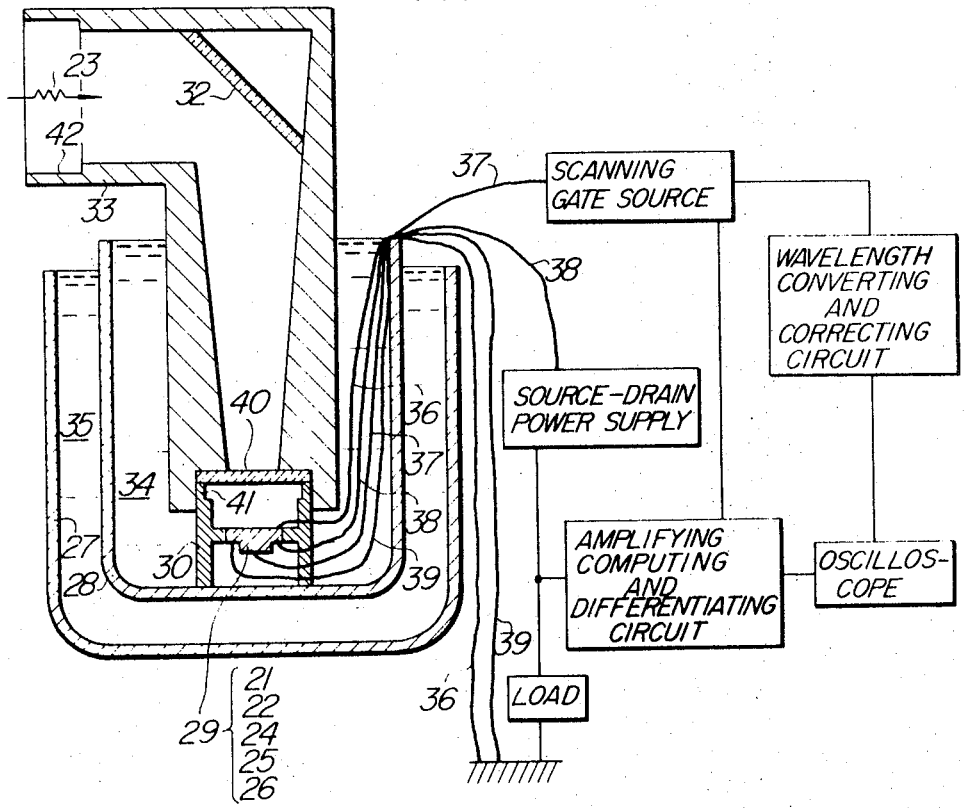
FIG. 12 is a partially sectional block diagram showing the structure and electrical connection of said embodiments.

Referring to FIG. 12, there is shown a sectional view of the scanning spectrometer of the present invention, which embodies the construction described above, together with a block diagram of the circuit. A MOS element 29 comprising a crystal body of P-type InSb 21, insulator layer 22, metal layer 24 and source and drain electrodes 25 and 26 is held by a support 30 and submerged in liquid $H_e$ 34 in a Dewar vessel 28 shielded from ambient temperature by liquid nitrogen 35 provided in a Dewar vessel 27. The support 30 is coupled to an optical path means 33 for directing a radiation beam 23 to the element 29. The optical path means 33 has a reflecting mirror 32 and filter 40, which deflects the radiation beam and interrupts the short wavelength component of the radiation beam 23, respectively. Therefore, only a component of wavelength longer than $\lambda_{min}$ (for example, $5\mu$) enters the element. Furthermore, sample supporting means 41 and 42 are provided in the support 30 and optical path means 33, respectively so that the spectral absorption coefficient of the sample may be measured at low temperatures and room temperatures.

A lead wire 36 from the semiconductor crystal 21 is directly grounded and a lead wire 37 from the gate electrode 24 is connected to a scanning gate source so that a scanning gate voltage is applied to the element 29. A lead wire 38 from the source electrode 25 is grounded through a source-drain power supply and a load. A lead wire 39 from the drain electrode 26 is directly grounded. The channel current is converted into a load voltage by such construction. Here, the gate source applies a sawtooth voltage of high frequency amounting to several hundreds kHz. to the element.

The channel current corresponding to said gate voltage is converted into an electrical output corresponding to the wavelength distribution of the radiation intensity by means of an amplifying and computing circuit such as shown in FIG. 11 and an usual differentiating circuit, and applied to a signal terminal of an oscilloscope. On the other hand, the gate voltage is converted in such a way that the wavelength or wave number changes linearly with time by the conversion circuit described above and applied to a scanning terminal of the oscilloscope. The said conversion circuit is calibrated by several monochromatic radiations. As described above, the intensity distribution of the radiation beam incident upon the element is repeatedly scanned with such a high speed as several hundreds kHz. and directly displayed on the face of the cathode ray tube in this embodiment. The element is cooled to the liquid helium temperature in said embodiment, so that the level widths of the quantum levels $E_0$, $E$ and $E_2$ are as narrow as one tenth of or less than $E_1 - E_0$. Then, the spread of the energy difference $E_1 - E$, that is, the spread of the absorption edge is small and the radiation intensity can be obtained with the accuracy almost of the same order as the accuracy of the cathode ray tube itself (usually 5 percent).

In the above described two embodiments of the present invention, the fact has been applied to the detection of the radiation beam that the radiation beam is absorbed into the inversion layer via the electronic transition between the quantum levels and the electrical conductivity of the inversion layer changes with the radiation intensity.

However, when the source-drain voltage $V_{C1}$ is applied to the element to which the gate voltage $V_{G1}$ has been applied as shown in FIG. 5, many electrons in the inversion layer are excited to the excited levels from the ground level. The so-called population inversion can be produced between the quantum levels by means of such phenomenon.

Figure 13:
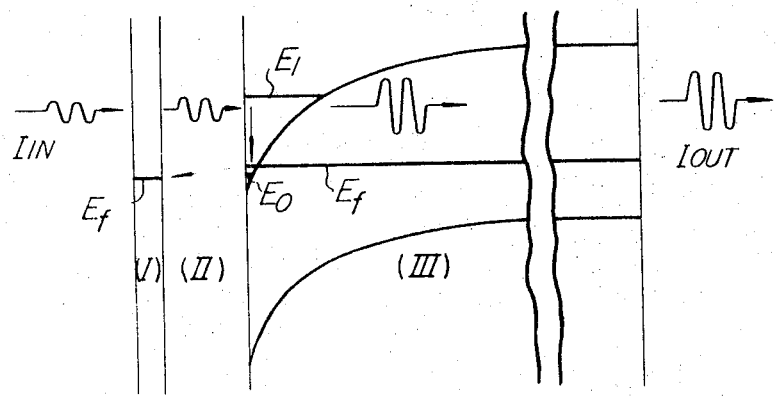
FIG. 13 is an energy diagram for illustrating the stimulated emission occuring in an embodiment for amplifying a radiation beam according to the present invention.

Referring to FIG. 13, there is shown an energy diagram of the operation of an embodiment, which performs the amplification of a radiation beam in the state that said population inversion is produced. That is, when a radiation beam $I_{in}$ having a wavelength corresponding to the energy difference $E_1 - E_0$ is directed to an element in the state of population inversion, an amplified radiation beam $I_{out}$ having the same wavelength as the incident radiation beam can be obtained by the well-known stimulated emission at the inversion layer. That is, a kind of maser action can be obtained when the source-drain voltage applied to the element is set at $V_{C1}$ or a little higher value. Though, an embodiment for achieving said amplification is not shown in the FIGS., such embodiment can be easily constructed as described below.

Figure 14:
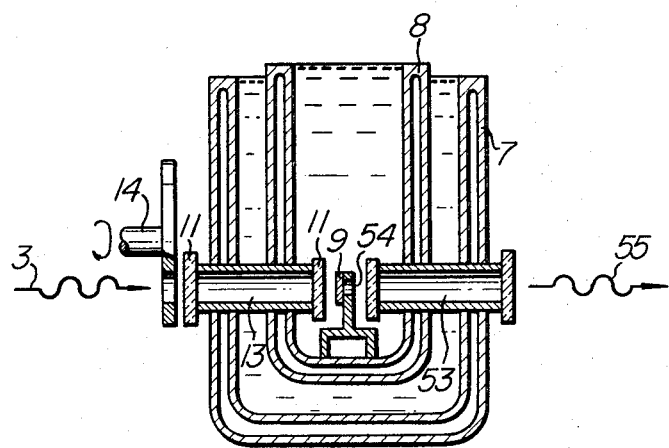
FIG. 14 is a cross section of another embodiment of the present invention.

Referring to FIG. 14, a second optical path means 53 similar to a first optical path means 13 as shown in FIG. 3a is provided to the cryostat symmetrically to the first optical path means 13 with respect to the element 9, and a support 54 corresponding to the support 10 in FIG. 3a is made in a form that a radiation beam can transmit therethrough. In such construction, a radiation beam directed to the element 9 which is in the above-described electrical condition is amplified and the amplified radiation beam 55 is guided to the outside through said second optical path means 53. Three embodiments of the present invention for detecting or amplifying the radiation beam in the range from infrared to far infrared have been described in detail above.

The present invention, if summarized again, comprises a device in which a radiation beam and a channel current are converted from one to the other via the resonance transition of carriers in the inversion layer energized to a suitable condition between the quantum levels to detect or amplify the radiation beam, and further to a device by which the radiation beam can be spectrally detected or amplified since the difference between the quantum levels taking part in said transition varies with the gate voltage.

The present invention has various features and advantages depending upon the condition of said energization. That is, a radiation beam is converted into a channel current with high sensitivity under the condition that the source-drain voltage amplifier in an element to which a certain gate voltage is applied is set at such a value that the resonance transition of carriers is caused by the field energization or around that value. In this case, when the gate voltage is scanned with the source-drain voltage fixed to that value, the photosensitivity of the element changes abruptly at said gate voltage. Therefore, the highest photosensitivity is obtained in the form of a pulse by differentiating the channel current with respect to the scanning voltage. Further, said radiation detection can be carried out with a high S/N ratio by using a lock-in amplifier in the detection circuit.

As described above, the present invention is characterized in that a detector with high sensitivity and high S/N ratio can easily be provided though it is apt to be noisy since the device utilizes surface carriers.

When the carriers in the inversion layer are slightly energized by the source-drain voltage, but are excited from the ground level to excited levels by the energization by the absorption of a radiation beam, the absorption edge can be varied continuously by scanning the gate voltage. In this case, the wavelength distribution of the radiation intensity can be easily detected continuously and displayed on the face of the cathode ray tube by supplying the channel current from a computing circuit for compensating for dependence of the photosensitivity to the gate voltage and a differentiating circuit. Further, a wide wavelength range from several $\mu$ to several tens of $\mu$ can be advantageously scanned at a high speed such as several hundreds mHz. since, in this case, the scanning of the wavelength is carried out by scanning the gate voltage corresponding to the difference between quantum levels.

The present invention having such advantage provides a high-speed scanning spectrometer which can easily follow phenomena in which the radiation intensity changes rapidly and which can perform spectral detection. The scanning spectrometer according to the present invention provides a novel means for the study of explosion phenomena or biochemical reaction when it is used with a camera for photographing continuously the surface of the cathode ray tube. Further, said scanning spectrometer according to the present invention provides a means for monitoring the change in the composition of or in the quantity of impurity in a sample material flowing on a process route in a factory with wide wavelength range and quick response.

Further, when the source-drain voltage applied to an element to which a predetermined gate voltage is applied is set at such a value that the electronic transition by field energization occurs or a little larger than that value, so-called population inversion is produced in the inversion layer and maser action can be produced. That is, a radiation beam having a wavelength equivalent to the difference between quantum levels corresponding to the gate voltage is amplified by the stimulated emission. Furthermore, the radiation amplifier according to the present invention is advantageous in that the wavelength component to be amplified changes in a range from several $\mu$ to several tens of $\mu$ depending upon the gate voltage and tunable amplification can be carried out. Moreover, said devices according to the present invention have such advantages that all of them are small, simple in structure, strong in construction, easy to operate and can be manufactured easily and inexpensively.

While some preferred embodiments of the present invention have been described above, it will be apparent to those skilled in the art that various changes and modifications can be made therein without departing from the spirit and scope of the present invention.

I claim:

1. A solid-state electronic device for detecting or amplifying a radiation beam in the range from infrared to far infrared comprising:

a MOS element having the property of producing an inversion layer therein in response to a gate voltage applied thereto; means for cooling said element to such a low temperature that substantially all of the carriers in said inversion layer populate in the ground quantum level formed therein, said cooling means being equipped with optical path means to direct a radiation beam to said inversion layer; a voltage source for applying a variable gate voltage to said element to control the energy difference between said ground level and an excited level formed in said inversion layer; and an electric circuit for setting and measuring the intensity of a channel current flowing through said layer, whereby the electronic transition between said levels occurs correspondingly to said current and said radiation to provide detection or amplification of said radiation.

2. A solid-state electronic device according to claim 1, wherein the metal layer of said MOS element is made thin so that said radiation beam is transmitted therethrough and is made of a material selected from the group consisting of Al, Ag and Av.

3. A solid-state electronic device according to claim 1, wherein the semiconductor layer of said MOS element is made of such a material as to be transparent to the predetermined wavelength range of said radiation beam, said radiation beam is directed to the surface of said semiconductor layer opposite to the insulating layer.

4. A solid-state electronic device according to claim 1, wherein the semiconductor layer of said element is made of a material selected from the group consisting of InSb, In As, GaSb and GaAs.

5. A solid-state electronic device according to claim 1, wherein said device further comprises an optical chopper disposed at the entrance of said optical path means for periodically interrupting said radiation beam, and said electric circuit includes a lock-in amplifier synchronized with said optical chopper, whereby said radiation beam is detected with low noise.

6. A solid-state electronic device according to claim 5, wherein said channel current is set, when no radiation is present, a little below the value at which said channel current changes abruptly with an increase in the source-drain voltage of said element to which a given gate voltage is applied.

7. A solid-state electronic device according to claim 6, wherein said voltage source is adapted to supply periodically scanning gate voltage to said element, and said circuit for measuring said channel current includes a differentiating circuit, whereby a sharp pulsive response is obtained to said radiation beam.

8. A solid-state spectrometer for the wavelength range from infrared to far infrared, comprising:

a MOS element being responsive to a gate voltage to produce an inversion layer therein;

means for cooling said element to such a low temperature that most carriers in said inversion layer populate in the ground quantum level formed therein, said cooling means being equipped with optical path means to direct a radiation beam to said inversion layer;

a voltage source for applying a scanning gate voltage to said element to scan the energy difference between said ground level and an excited quantum level formed in said inversion layer, said energy difference being equivalent to the absorption edge in said inversion layer due to the electronic transition between said levels;

electrical means for setting the source-drain voltage of said element at such a small value that no said carriers are excited by the field energization of said set voltage, said radiation beam raising said carriers from said ground level to said excited level to convert them into a channel current to flow through said inversion layer;

a first electric circuit for computing, amplifying and differentiating said channel current in synchronization with said gate voltage to correct the dependency of the photosensitivity of said element on said gate voltage and to separate the integrated wavelength component; and means for displaying the output signal from said first electric circuit.

9. A solid-state spectrometer according to claim 8, wherein said spectrometer comprises a second electric circuit for transforming said gate voltage into a predetermined waveform connected with said voltage source, and said displaying means is an oscilloscope, the signal terminal thereof being connected with the output of said first electric circuit, the scanning terminal thereof being connected with the output of said second electric circuit, whereby the intensity distribution of the wavelength components of said radiation beam is displayed directly on the face of the cathode-ray tube of said oscilloscope.

10. A solid-state radiation amplifier for the wavelength range from infrared to far infrared comprising:

a MOS element being responsive to a gate voltage to produce an inversion layer therein;

means for cooling said element to such a low temperature that most carriers in said inversion layer populate in the ground quantum level formed therein, said cooling means being equipped with first optical path means to direct a radiation beam to said inversion layer and with second optical path means to direct a radiation beam emitted from said inversion layer outward;

a voltage source for applying a variable gauge voltage to said element to control the energy difference between said ground level and an excited quantum level formed in said inversion layer; and means for setting a source-drain voltage at such a value that the electronic transition by the field energization of said voltage produces the population inversion of said carriers, whereby the component of said radiation beam having a wavelength equivalent to said energy difference is amplified by the stimulated emission.